United States Patent [19]

Dopp

[11] Patent Number: 4,628,807
[45] Date of Patent: Dec. 16, 1986

[54] DEVICE FOR THE WET TREATING OF SEED MATERIAL

[75] Inventor: Siegfried Dopp, Hamburg, Fed. Rep. of Germany

[73] Assignee: Mantis ULV - Sprühgeräte GmbH, Hamburg, Fed. Rep. of Germany

[21] Appl. No.: 697,115

[22] Filed: Jan. 30, 1985

[30] Foreign Application Priority Data

Jan. 30, 1984 [DE] Fed. Rep. of Germany ....... 3403069
Feb. 10, 1984 [DK] Denmark ................. 599/84

[51] Int. Cl.$^4$ .......................... B02B 1/04; B02B 5/00; B02B 7/02
[52] U.S. Cl. ....................................... 99/488; 99/516; 99/524; 99/609
[58] Field of Search ................. 99/483, 485, 487, 488, 99/516, 534, 536, 518, 519, 524, 600, 609; 47/57.6, DIG. 9; 118/24, 303

[56] References Cited

U.S. PATENT DOCUMENTS

| | | | |
|---|---|---|---|
| 3,288,052 | 11/1966 | Hough | 99/516 X |
| 3,817,261 | 6/1974 | Rogge | 99/536 X |
| 4,185,547 | 1/1980 | Nakazato et al. | 99/536 X |
| 4,508,029 | 4/1985 | Malone | 99/534 X |
| 4,528,901 | 7/1985 | Vick et al. | 99/524 X |

FOREIGN PATENT DOCUMENTS 3318895 11/1984 Fed. Rep. of Germany .

Primary Examiner—Timothy F. Simone
Attorney, Agent, or Firm—Michael J. Striker

[57] ABSTRACT

A device for the wet treating of seed material includes a rotation-symmetrical treating chamber assembled of a conically shaped, downwardly sloping upper wall and of a frustoconical downwardly sloping bottom wall defining a central discharge opening. A circumferential annular gap connects the upper surface of the upper wall with the inner surface of the lower wall. A spraying device for a treating liquid is arranged in the treating chamber. Seed material is fed from a storage container through a gravity pipe arranged concentrically above the upper wall of the treating chamber. A dosing pipe surrounding a lower part of the gravity pipe is provided near its lower end with an internal expansion having an annular bottom surface and a discharge opening, the diameter of which at most slightly exceeds the inner diameter of the gravity pipe. The dosing pipe is guided for limited coaxial displacement relative to the gravity pipe. A deflecting surface is disposed concentrically below the discharge opening of the dosing pipe, which is supported via resilient energy storing means permanently urging said dosing pipe into a rest position, in which the annular clearance between the deflecting surface and the lower end of the dosing pipe has a predetermined breadth. The energy storing means and the dimensions of the expansion are mutually adjusted such that during operation the weight of the seed material collected on the annular bottom surface of the expansion automatically regulates the breadth of the annular clearance to provide a uniform flow rate of the seed material.

12 Claims, 3 Drawing Figures

DEVICE FOR THE WET TREATING OF SEED MATERIAL

BACKGROUND OF THE INVENTION

The present invention relates to a device for the wet treating of seed material, such as grains, comprising a substantially rotation-symmetrical treating chamber including an annular bottom wall sloping towards a central discharge opening thereof, an upper wall concentrically arranged above the bottom wall and sloping towards the periphery of the latter, the rim of the upper wall being spaced apart from the periphery of the bottom wall to form therewith an annular gap for passing the seed material into the treating chamber spraying means arranged in the treating chamber and being connected to a source of treating liquid; seed feeding means having an outlet opening arranged concentrically above said upper wall to feed the seed material onto the latter; and dosing means being slidably supported for limited coaxial displacement relative to the outlet opening of said seed feeding means.

British Pat. No. 972 854 discloses a device of this kind especially suited for cotton seed in which the seed material is positively fed by an auger conveyor from a hopper through a discharge opening from which the seeds are fed on the upper wall of the treating chamber. The flow of the cotton seed is regulated manually by displacing a slide collar surrounding the lower outlet end of said hopper. The cotton seeds are distributed on the upper wall of the treating chamber and thereafter slide down on the botteom wall thereof to the central discharge opening while being sprinkled with the treating agent.

The quantity of the treating agent applied to a certain quantity of seed material is restricted by law to be within certain narrow weight limits. The treating agent must be applied on the grains of the seed material from all sides and as uniformly as possible. The flow regulating slide collar of the known device cannot provide a sufficiently constant flow rate of the seed material so that considerable fluctuations of the weight ratio between the seed and the treating agent will occur. Moreover, the known device is not suited for small seeds and does not permit an exact preadjustment of flow rates for different kinds of seeds and different throughputs. Due to the predominantly sliding movement of the seed material on the bottom wall of the treating chambere, the grains are sprinkled with the treating agent in a non-uniform manner and frequently are wetted on one side only.

SUMMARY OF THE INVENTION

It is, therefore, an general object of the present invention to overcome the aforementioned disadvantages.

More particularly, it is an object of the invention to provide an improved wet treating device of the afore-described kind which is simple in design, inexpensive in manufacture and which permits a fast and uniform application of treating liquid on the entire surface of the seeds.

Another object of this invention is to insure an exact reproducibiility of a preset weight ratio between the seeds treated and the supplied treating agent.

In keeping with these objects and with others which will become apparent hereafter, one feature of the invention resides in that the seed treating device of the type described above is provided with a gravity feed pipe of a uniform open inner diameter having an outlet opening arranged concentrically above said upper wall of the treating chamber, a dosing pipe surrounding a lower part of said gravity pipe and being slidably supported for limited coaxial displacement relative to the latter; said dosing pipe having near its lower end an expansion of increased internal diameter including an internal annular bottom surface and a central discharge opening disposed coaxially downstream of said outlet opening and having a diameter being at most slightly larger than the inner diameter of said gravity pipe; a deflecting surface disposed in a distance concentrically below the discharge opening of said dosing pipe; resilient energy storing means means connected to said dosing pipe to permanently urge the same into a rest position in which an annular clearance of predetermined breadth is established between said deflecting surface and the lower end closing pipe, the cross-sectional area of said annular clearance being less than the inner cross-sectional area of said gravity pipe; said energy storing means and the dimensions of said expansion being adjusted so that in operation of the quantity of seed material accumulated on the annular bottom surface of the expansion automatically adjusts the breadth of said annular clearance to provide a uniform flow rate of the seed material.

The seed treating device of the invention permits to feed the seed material and the liquid treating agent into the treating chamber with a uniform proportion by weight whereby any differences in seed shape, moisture content, surface properties, specific weight and the like between different charges of seed material or between different kinds of the seeds and fluctuations in the quantities discharge from the charging container are automatically neutralized. Accordingly, an accurate maintenance and reproducibility of the preset weight ratio is obtained in a simple and inexpensive manner.

In the preferred embodiment of this invention, the breadth of the annular clearance between the lower end of said dosing pipe and said deflecting surface is adjustable. The adjustability in the rest position of the dosing pipe permits a reliable preselection of the flow rate of throughflow of the seed material per time unit. The preadjustment of the rest position of the dosing pipe is preferably combined with a corresponding regulation of the supply of the treating liquid. The seed material is sprayed during its descent on the inner surface of the bottom wall of the treating chamber and simultaneously the bottom of the chamber is subjected to vertical vibrations so that the seeds are continuously thrown up and down. As a consequence, the seed material is uniformly coated by the treating agent on all sides of the seeds.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
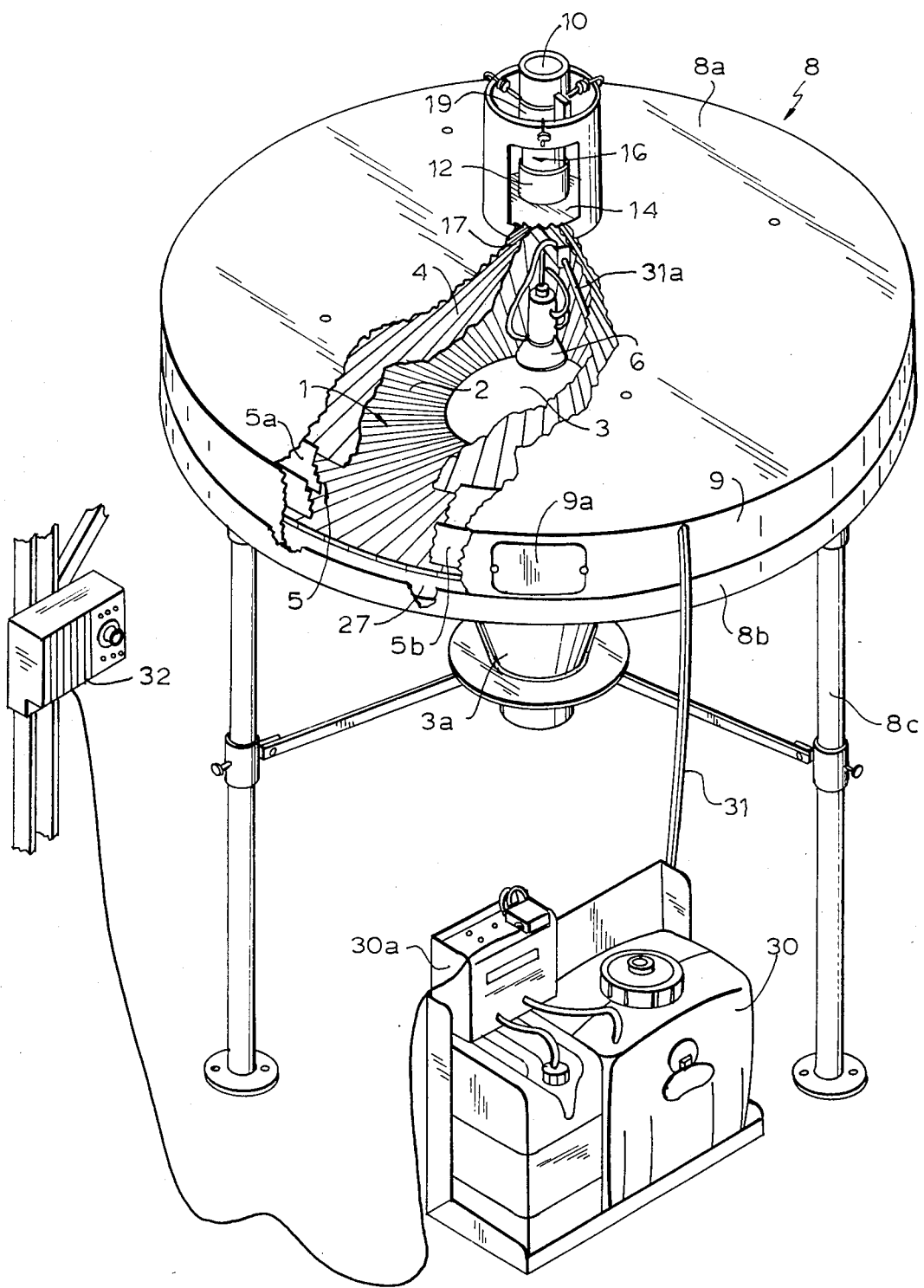
FIG. 1 is a perspective view, partly in section, of the seed treating device of this invention shown without the charging container.
Figure 2:
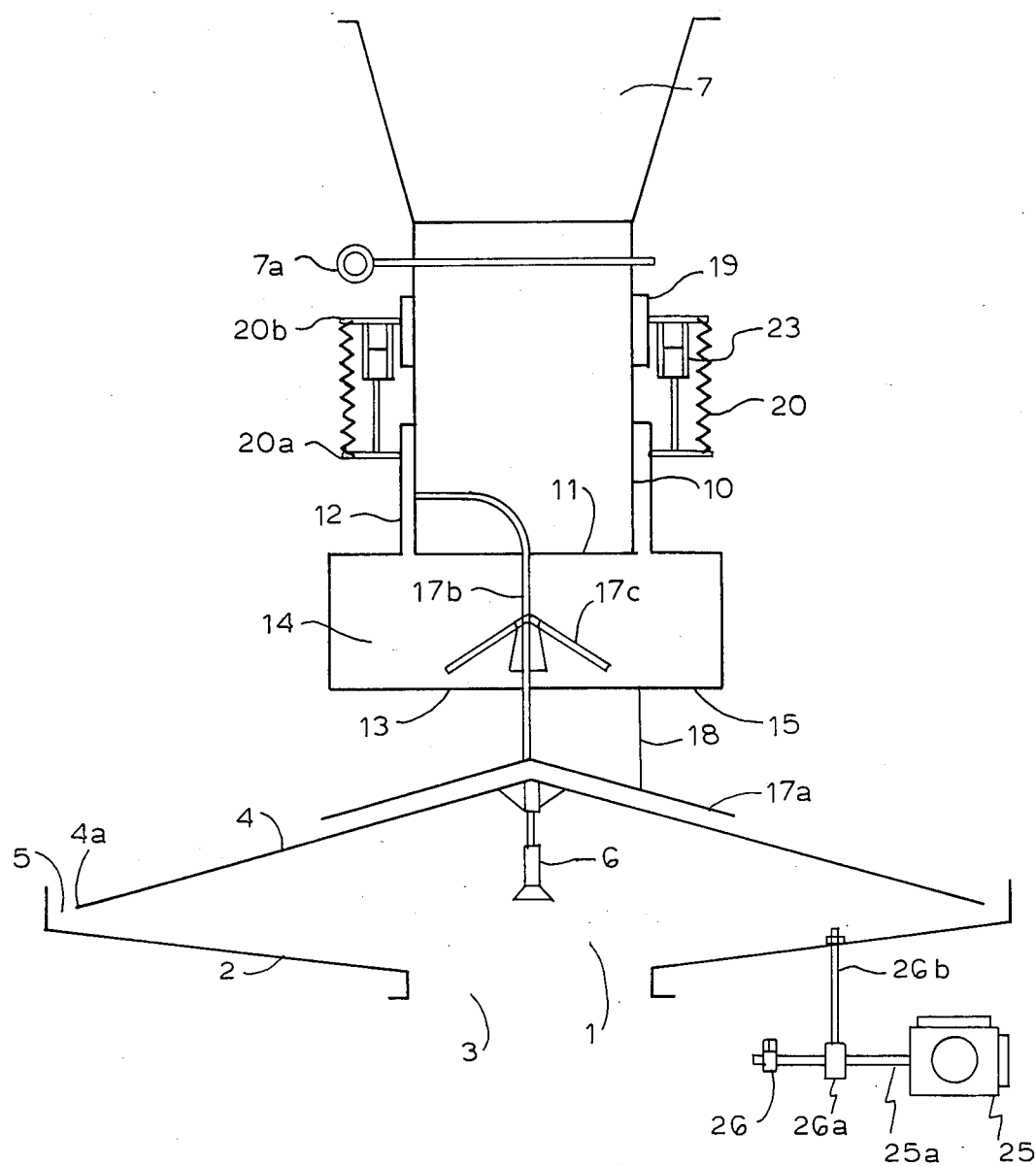
FIG. 2 is a schematic sectional view of a preferred seed treating device of this invention.

In FIG. 1, the embodiment of FIG. 2 is illustrated without the charging container. The treating device of this invention includes a substantially rotation-symmetrical treating chamber 1 having an annular bottom wall 2 sloping from its outer periphery toward a central discharge opening 3, a concentrically arranged upper wall 4 slopes from its center toward the periphery of the bottom wall 2 whereby the outer rim 4a of the upper wall defines with the outer rim of the bottom wall 2 an annular intake gap 5 for receiving the seed material to be treated. A tubular connection piece 3a is connected from below to the discharge opening 3 of the bottom wall 2 of the treating chamber.

The treating chamber is installed in a housing 8 whose upper part 8a is provided on its inner surface with a downwardly directed guiding web 5a. The lower edge of the guide web 5a is connected to an elastic ring-shaped guide strip 5b which extends downwardly in axial direction to contact the peripheral portion of the bottom wall 2 of the treating chamber. The ring-shaped guiding web 5a and the guiding strip 5b serve for diverting a layer of seed material moving on the outer surface of the upper wall 4 toward the outer rim 4a and through the gap 5 on the inner surface of the bottom wall 2. As mentioned before, the treating chamber 1 is located in a housing 8. The upper part 8a of the housing can be connected to the lower housing part 8b by a cylindrical wall 9 provided with a normally closed inspection window 9a which enables the access in the interior of the treating chamber 1. In a modification, the cylindrical wall 9 can be made of an elastic material and the upper housing part 8a is connected to the lower housing part 8b by suitable frame elements and the inspection window 9a can be dispensed with.

The housing 8 is supported on legs 8c secured to the lower part 8b. Close to the periphery of the inner side of the lower housing part 8b there is arranged a ring shaped buffer 27 on which the bottom wall 2 of the treating chamber 1 rests.

In the interior of the treating chamber 1, there is arranged a spraying device 6 for spraying during operation the seed material moving on the inner surface of the bottom wall 2 toward the discharge opening 3. During the treating operation a liquid treating agent is delivered by a pump 30a, from a supply container 30 through a hose 31 and through a supply conduit 31a connected to the spraying device 6 in the treating chamber. A switching device 32 serves for energizing the pump 30a and for adjusting the delivery from the pump to the spraying device 6.

Figure 3:
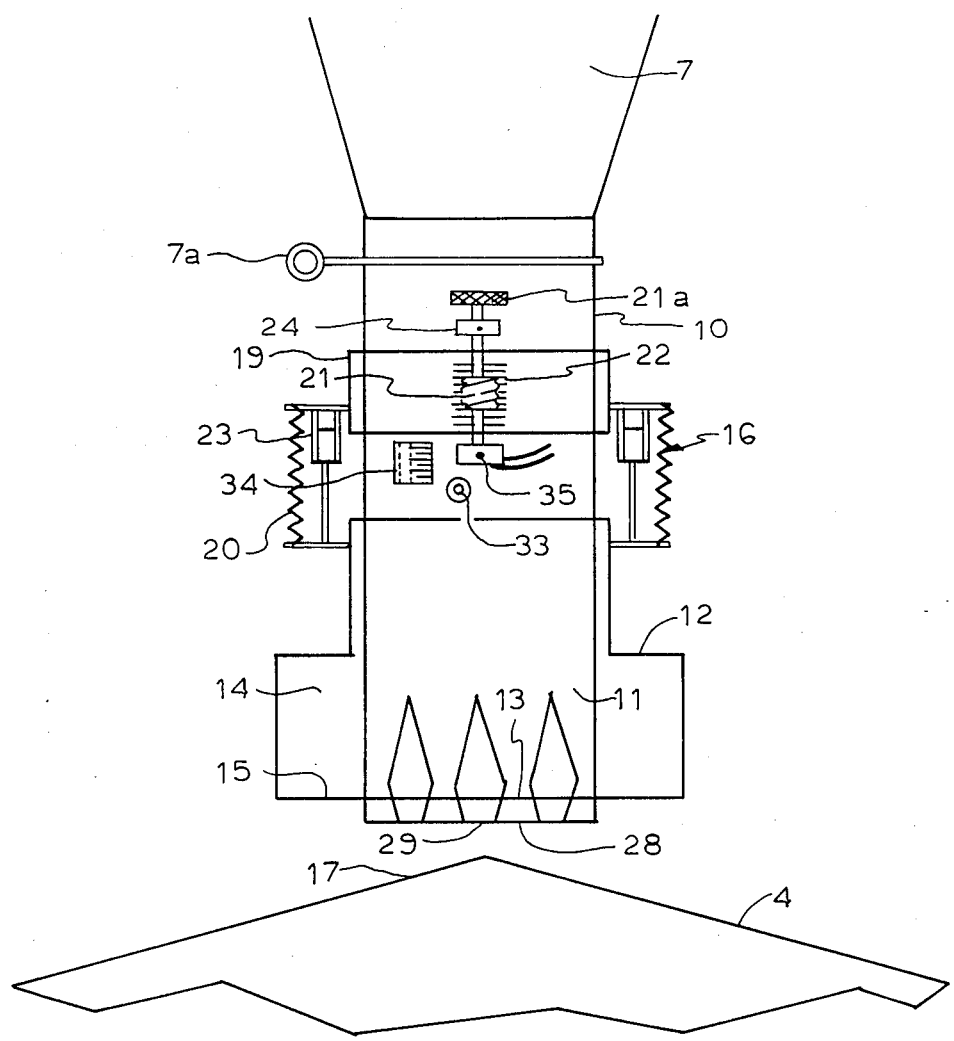
FIG. 3 is a schematic sectional side view of a modified seed treating device of this invention.

In the following description the details of the regulating device for controlling the rate of flow of the seed material will be described in connection with FIGS. 1 through 3. The bottom side of charging container 7 is connected to a vertical cylindrical gravity pipe 10 with open internal space whose outlet opening 11 is concentrically arranged above the tip of the upper wall 4 of the treating chamber 1. The gravity pipe 10 has a constant free internal diameter of 90 mm. A dosing pipe 12 surrounds coaxially a lower section of the gravity pipe 10 and is shiftable in opposite directions along the central axis of the latter. Near the lower end of the dosing pipe 12 there is provided an internal expansion 14 of larger diameter having an annular bottom surface 15 surrounding a central discharge opening 13 whose diameter corresponds to the diameter of the outlet opening 11 of the gravity pipe 10. In the embodiment of FIG. 3, the discharge opening 13 is slightly larger than the outlet opening 11. The cross-section of the expansion 14 is uniform and its annular bottom surface 15 is slightly sloping toward the discharge opening 13. The annular bottom surface 15, as it will be explained below, serves for collecting a certain quantity of seed material discharged from the gravity pipe 10. A sloping deflecting member 17a is concentrically arranged below the discharge opening 13 and covers a central area of the upper wall 4 of the treating chamber. The deflecting surface can be also formed directly by the central area 17 of the upper wall 4 (FIG. 3). the deflecting surface serves for a uniform distribution of the incoming seed material on the upper wall 4 of the treating chamber.

A supporting ring 19 coaxially surrounds an upper part of the gravity pipe 10 and can be secured to the latter in an adjustable position by non-illustrated fastening means. The supporting ring 19 serves as support for biasing springs 20 whose free ends are connected to projections 20a at the upper end of the shiftable closing pipe 12. The other end of each spring 20 is connected to a projection 20b on the supporting ring 19. Oscillatory movements of the dosing pipe 12, its expansion 14 and the biasing springs 20 are suppressed by dampers 23 arranged between the terminal projections 20a and 20b. The biasing springs 16 can be replaced by another type of energy storing device as indicated in FIG. 1.

Adjusting means for changing the position of the supporting ring 19 relating to the gravity pipe 10 include an adjusting tooth rack 22 which is rigidly secured to the supporting ring 19 and being in permanent engagement with a setting worm 21 which is supported for rotation in bearings 24 and 35 on the gravity pipe 10. The worm gear 21 is rotatable by an actuation knob 21a thus causing via the tooth rack 22 an axial displacement of the supporting ring 19 relative to the gravity pipe. A graduation 34 indicates the extent of this displacement and hence the breadth of the annular clearance 18 between the rim of the discharge opening 13 and the deflecting surface 17 in a rest position of the dosing pipe 12. The annular clearance 18 is adjusted by the corresponding displacement of the supporting ring such that the cross-sectional area of the annular clearance 18 is less than the cross-section of the discharge opening 13. The energy storing devices 16, the weight of the dosing pipe 12 and the dimensions of the expansion 14 are mutually adjusted such that in operation the breadth of the clearance 18 is continuously automatically regulated by the weight of the seed material which accumulates on the annular bottom surface 15 in the expansion 14. The dosing pipe 12 in its rest position switches off a switch 33 which in turn deenergize the supply pump 30a for the wetting agent. Accordingly, the supply of the treating agent to the spraying device 6 is initiated only after the dosing pipe 12 has been moved from is rest position by the weight of the seed material accumulated in said expansion 14. The breadth of the annular clearance 18 in the rest position of the dosing pipe 12, is sensed by a regulating device 35 which cooperates with the adjusting devices 21 and 22. The regulation device 35 regulates the supply of treating agent to the spraying device 6 by a corresponding adjustment of the delivery of the pump 30a.

In operation, the seed material, after opening of a slide gate 7a in the upper part of the gravity pipe 10 starts flowing from the charging container 8 through the outlet opening 11 of the gravity pipe, whereby a minor part of the seed material accumulates on the annular bottom surface 15 of the expansion 14 and due to its impact and weight displaces the dosing pipe 12 against the force of the biasing springs 20 in the direction towards the deflecting member 17. Due to this downward movement the annular space in the expansion 14 receives an additional amount of seed material so that the annular bottom surface 15 may momentarily contact the deflecting surface 17 whereby the annular clearance 18 is temporarily closed and the extension 14 is filled with additional incoming seed material. Thereafter, the tensioned biasing springs 30 come to effect and lift the dosing pipe 12 away from the deflecting surface 17 to such an extent that the seed material can flow through the resulting annular clearance 18. The breadth of the annular clearance 18 which during the operation of the device is smaller than the breadth of the clearance in the rest position, is determined by the specific weight of the seed material loading the expansion 14, and by frictional forces resulting from the action of the stream of seeds grains flowing past and in contact with the seeds deposited on the annular bottom surface 15. Any dynamic flow fluctuations in the gravity pipe 10 are thus neutralized by corresponding axial movements of the dosing pipe 12. From the annular clearance 18 the seed material flows on the deflecting surface 17 which can be the closed upper wall 4 of the treating chamber 1 (FIG. 3) In a preferred embodiment there is used a separate deflecting member 17a (FIG. 2) fixed above the upper wall 4 by a support rod 17b rigidly mounted to the inner wall of the gravity pipe 10 and provided with a deflecting crosspiece 17c for deflecting seeds into the expansion 14. To modify the size or geometry of the annular clearance 18 the deflecting member 17a may differ in configuration from that of the upper wall 4.

In the preferred embodiment, the upper wall 4 of the treating chamber is conical with a slope of about 20° so that the seed material slides toward the outer rim 4a and passes through the intake gap 5 on the downwardly sloping inner surface of the bottom wall 2. The bottom wall as seen from FIG. 2, is linked by a connection rod 26a to a ball bearing 26a which is seated on a driving shaft 25a of a motor 25. The free end of the driving shaft 25a supports an unbalancing element 26 in the form of a clamping collar which is clamped to the shaft and projects therefrom in radial direction. In operation, the driving shaft 25a rotates at a speed between 2,500 to 3,000 r.p.m.; oscillations generated by the unbalancing element 26 are transmitted via the connection rod 26b to the bottom wall and if desired to the upper wall 4 of the treating chamber and transmit substantial vertical vibrations to the latter walls. Due to the fact that the treating chamber 1 is sealed on the elastic buffer member 27, permitting vibrations and since the motor 25 is also resiliently supported on vibrational metallic supports, the generated strong vibrations have no detrimental effect on the device.

The bottom wall 2 of the treating chamber is sloping only at an angle of 7° relative to a horizontal plane so that without the vibrating movements the seed material in the treating chamber cannot move towards the discharge opening 3. By vibrating the bottom wall 2 the seed material is continuously conveyed from the intake gap 3 to the discharge opening 3 and continuously ejected up and turned around. Consequently, the spraying device 6 applies the treating liquid on all sides of the treated seeds whereby the supply of the treating liquid to the spraying device 6 is exactly regulated by the regulating device 35 in accordance with the rate of flow and with the specific weight of the seed material passing through the device. The treated seed material is continuously discharged through the outlet connection piece 3a projecting downwardly from the discharge opening 3.

In practical tests performed on the devices shown in FIGS. 1 and 2, the flow rate of respective amounts of 25 kg. of wheat, oat, rye and barley have been measured and the corresponding time intervals necessary for the throughflow have been plotted in dependency on the adjustment of the supporting ring 19 and hence the preadjustment of the breadth of the annular clearance 18 in the rest position of the dosing pipe 12. In these measurements, with the device of FIG. 1, the breadth of the annular clearance 18 in the rest position has been set to 4.2 centimeters for the maximum throughflow value of about 10 tons of seed material per hour, and to 2 centimeters for a lower throughflow of about 4 tons of seed material per hour. The flow rates or the quantities by weight of the seed material flowing through the device where the same for all four kinds of seed within an error limit of about 5%, in spite of the fact that specific weights of the aforementioned kinds of seeds differed one from the other up to 40%.

In a preset throughflow of 5.3 tons of wheat per hour in the device of FIG. 2, the measured annular clearance 18 has changed from 37 mm in the rest position to 20 mm during the throughflow of the seed material. The dosing pipe 1 immediately after the beginning of the throughflow of the seed material dropped against the deflecting surface 17 so that the annular gap 18 was momentarily closed and thereafter it was lifted by the biasing means without substantial oscillations into operative position, in which the dosing members performed due to the effect of the passing seed material only very small vibrations of about 2 mm. The time constant of the weight quantities of the throughflowing seed material was monitored by a weight scale supporting a receiving container below the discharge connection 3a.

The output of the pump 30a for the treating liquid is regulated in dependency of the position of the bearings 24 of the regulating device determining the relative position of the supporting ring 19 on the feed pipe 10. It is necessary therefore that the adjustment of the position of the supporting ring 19 brings about a proportional change in the supply of the treating liquid.

In the embodiment according to FIGS. 1 and 2 a certain deviation from the linearity of the throughflow for different quantities of seed material was observed. In other words, the increase of the breadth of the annular clearance 18 corresponding to a change of the throughflow from 4 tons of seed material per hour to 5 tons per hour, it not equal to the increase of the breadth of the clearance 18 corresponding to a change of the throughflow from 9 tons per hour to 10 tons per hour. Whereas by a suitable non-linear coupling between the adjusting devices 21 and 22 and the regulating devices 24 this non-linear behavior can be compensated for, a different approach is illustrated in the embodiment of FIG. 3. In the latter example, to overcome the non-linearity of the course of throughflow, the outlet opening 11 of the gravity pipe 10 is provided with axially directed wall segments 28 which in the rest position of the dosing pipe 12 project in the direction towards the deflecting surface 17 through the discharge opening 13. The cutouts 29 between the wall segments 28 have a substantially rhomboic configuration. In preadjusting this embodiment for lower throughflows of the treated seed material, the rest position of the dosing pipe 12 is adjusted relative to the deflection surface 17 approximately such that the discharge opening 13 is below the wall segments 28. The operation of this embodiment corresponds exactly to that of the embodiment of FIGS. 1 and 2. For higher throughflows however the rest position of the dosing pipe is adjusted by shifting the supporting ring 19 away from the deflecting surface 17 to such an extent that the expansion 14 substantially encloses the lateral cutouts 29 between the wall segments 28 of the gravity pipe 10. After the discharge of a part of the seed material through the lateral cutouts 29 or if desired through additional discharge openings arranged above the latter, the dosing pipe 12 is lowered in the manner described above in the direction towards the deflecting surface 17 and the expansion 14 is filled with seed material. Thereafter the dosing pipe 12 is raised by the action of the biasing spring 16 and the seed material starts flowing through the device and the discharge opening 13 of the expansion 14 in the case of high throughflows moves in the range of the axially directed wall segments 28, so that the annular clearance 18 is changed according to the geometry of the wall segments and the non-linear relation between the breadth of the annular clearance 18 and the flow rate at high throughflows is compensated. The wall segments 28 may support an inwardly directed deflecting surface in the form of an annular web which connects the lower ends of the wall segments 28. The annular deflection surface may have a central discharge opening of a diameter of about one-half the diameter of the outlet opening 11 of the gravity pipe 10, and a frustoconical upper surface sloping radially outwardly so that seed material accumulated on the deflecting surface can be discharged radially through the lateral cutouts 29. In a variation, instead of the annular deflecting surface the individual wall segments 28 can be provided with inwardly directed deflecting surface portions.

It will be understood that each of the elements described above, or two or more together, may also find a useful application in other types of constructions differing from the types described above.

While the invention has been illustrated and described as embodied in specific examples of the wet treating device, it is not intended to be limited to the details shown, since various modifications and structural changes may be made without departing in any way from the spirit of the present invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for the wet treating of seed material, such as grains, comprising a substantially rotation-symmetrical treating chamber including an inwardly sloping annular bottom wall, a central discharge opening surrounded by said bottom wall, an upper wall concentrically arranged above said bottom wall and sloping towards the periphery of the latter, said upper wall having an outer rim being spaced apart from the peirphery of the bottom wall to form therewith an annular gap for passing the seed material into the treating chamber; spraying means arranged in the treating chamber and being connected to a source of treating liquid; a gravity pipe having a downward outlet opening arranged concentrically above said upper wall to feed the seed material onto the latter; a dosing pipe surrounding said gravity pipe and being supported for limited coaxial displacement relative to the latter, said dosing pipe having an internal expansion of increased internal diameter including an internal annular bottom surface and a discharge opening disposed coaxially downstream of said outlet opening and having a diameter being at most slightly larger than said outlet opening; a deflecting surface disposed concentrically at a distance below said discharge opening; resilient energy storing means for urging said dosing pipe against the force of gravity into a rest position in which an annular clearance of predetermined breadth is established between said discharge opening and said deflecting surface; said energy storing means and the dimensions of said expansion being adjusted such that in operation the seed material loading said dosing pipe and its internal expansion automatically adjusts the breadth of said annular clearance to provide a constant weight flow rate of the seed material substantially independent of properties and density of the treated seed material.

2. A device as defined in claim 1 wherein an upper end of said gravity pipe is connected to a charging container for said seed material and is provided with a slide gate.

3. A device as defined in claim 1, wherein said resilient energy storing means includes a supporting ring secured to said gravity pipe and being adjustable in position relative to the latter; and at least one biasing spring suspended between said supporting ring and said dosing pipe.

4. A device as defined in claim 1, further comprising adjusting means for manually adjusting in said rest position the breadth of said annular clearance between said deflecting surface and the discharge opening of said dosing pipe.

5. A device as defined in claim 1, and further including dampening means connected to said dosing pipe to dampen vibrations of the latter during the flow of said steel material.

6. A device as defined in claim 1, further comprising measuring means for measuring the breadth of said annular clearance, and means for regulating the supply of said treating liquid to said spraying means depending on the actual breadth of said annular clearance measured by said measuring means.

7. A device as defined in claim 1, wherein said upper wall of the treating chamber has a conical configuration and said deflecting surface is formed by a central portion of said conical upper wall.

8. A device as defined in claim 1, further comprising means for producing vertically directed vibrations of at least the bottom wall of said treating chamber.

9. A device as defined in claim 1, wherein a lower portion of said gravity pipe is formed with a plurality of axially directed cutouts of a substantially rhomboic or trapezoidal configuration defining complementary wall segments therebetween.

10. A device as defined in claim 1, comprising a deflecting member separate from the upper wall of the treating chamber, said deflecting member being disposed concentrically downstream said discharge opening and connected by a supporting member to said gravity pipe.

11. A device as defined in claim 10, wherein said deflecting member is rigidly fixed to the inner wall of said gravity pipe by a support bar provided with at least one deflecting element arranged above the annular bottom surface of said expansion for deflecting seed material flowing down through said gravity pipe into said expansion.

12. A device as defined in claim 11 further comprising an auxiliary deflecting member mounted on said support rod to deflect part of the seed material on said annular bottom surface.

* * * * *